United States Patent
Yu

(10) Patent No.: US 12,371,551 B2
(45) Date of Patent: Jul. 29, 2025

(54) RESIN COMPOSITION COMPRISING LIPOPHILIC POLYMER-MODIFIED INORGANIC WHISKERS, POLARIZER AND DISPLAY DEVICE

(71) Applicant: TCL CHINA STAR OPTOELECTRONICS TECHNOLOGY CO., LTD., Guangdong (CN)

(72) Inventor: Lesheng Yu, Guangdong (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/360,828

(22) Filed: Jul. 28, 2023

(65) Prior Publication Data

US 2024/0343890 A1    Oct. 17, 2024

(30) Foreign Application Priority Data

Apr. 13, 2023  (CN) .......................... 202310409901.5

(51) Int. Cl.
| | |
|---|---|
| *G02B 5/30* | (2006.01) |
| *C08K 9/08* | (2006.01) |
| *C08L 33/08* | (2006.01) |
| *G09F 9/30* | (2006.01) |

(52) U.S. Cl.
CPC ............... *C08K 9/08* (2013.01); *C08L 33/08* (2013.01); *G02B 5/305* (2013.01); *G09F 9/30* (2013.01); *C08K 2201/003* (2013.01); *C08K 2201/004* (2013.01); *C08L 2203/20* (2013.01)

(58) Field of Classification Search
CPC ............... G02B 5/30; C08K 2201/002; C08K 2201/003; C08K 2201/004; Y10T 428/2933; Y10T 428/294; Y10T 428/2942; Y10T 428/2991; Y10T 428/2998

See application file for complete search history.

(56) References Cited

U.S. PATENT DOCUMENTS 6,368,699 B1 * 4/2002 Gilbert ................... G02B 5/287
                                                                  359/359
12,117,689 B1 * 10/2024 Li ....................... G02F 1/133531
(Continued)

FOREIGN PATENT DOCUMENTS

| JP | 2008129546 A | * | 6/2008 | |
|---|---|---|---|---|
| WO | WO-2024212352 A1 | * | 10/2024 | ............... G02B 1/14 |

OTHER PUBLICATIONS

Totani et al., Scattering-Type Polarizers Consisting of Fiber/Matrix and Methods to Enhance Polarization Property, 2009 Jpn. J. Appl. Phys. 48 082403 (Year: 2009).*

(Continued)

*Primary Examiner* — Hoa (Holly) Le
(74) *Attorney, Agent, or Firm* — PV IP PC; Wei Te Chung

(57) ABSTRACT

The present disclosure provides a resin composition, a polarizer, and a display device, which include a first polymer and a polymer-modified whisker dispersed in the first polymer. The polymer-modified whisker includes a whisker and a second polymer attached to a surface of the whisker. The first polymer is a lipophilic polymer, and the second polymer is a lipophilic polymer.

19 Claims, 4 Drawing Sheets

(56) References Cited

U.S. PATENT DOCUMENTS

| | | | | |
|---|---|---|---|---|
| 2006/0022378 A1* | 2/2006 | Fukatsu | ................ | B29C 48/022 |
| | | | | 264/211 |
| 2007/0153162 A1* | 7/2007 | Wright | ................ | G02B 5/3025 |
| | | | | 349/96 |
| 2008/0151372 A1* | 6/2008 | Ouderkirk | .............. | G02B 1/105 |
| | | | | 359/493.01 |
| 2016/0297938 A1* | 10/2016 | Shiraishi | ................ | B32B 27/08 |
| 2023/0041225 A1* | 2/2023 | Lee | ...................... | G02B 5/3033 |

OTHER PUBLICATIONS

Translation WO-2024212352 (Year: 2024).*

* cited by examiner

RESIN COMPOSITION COMPRISING LIPOPHILIC POLYMER-MODIFIED INORGANIC WHISKERS, POLARIZER AND DISPLAY DEVICE

CROSS-REFERENCE TO RELATED APPLICATIONS

This application claims priority to Chinese Patent Application No. 202310409901.5, filed on Apr. 13, 2023, the contents of which are incorporated herein by reference in its entirety.

TECHNICAL FIELD

The present disclosure relates to the field of display, and in particular, to a resin composition, a polarizer, and a display device.

BACKGROUND

At present, in order to enlarge chromaticity viewing angle of a display device, a functional layer for enlarging chromaticity viewing angle is generally provided in a polarizer. However, light-diffusing particles included in the functional layer for enlarging chromaticity viewing angle tend to be poorly dispersed in the functional layer, resulting in aggregation of the light-diffusing particles in the functional layer. Therefore, the actual usage amount of the light-diffusing particles may be increased, and the light transmission rate of the display device may be reduced.

Accordingly, it is desirable to provide a resin composition, a polarizer, and a display device to address the above defects.

SUMMARY

An embodiment of the present disclosure provides a resin composition, a polarizer, and a display device, which can alleviate the defects of increased actual usage amount of light-diffusing particles in a functional layer for enlarging chromaticity viewing angle due to poor dispersion thereof and decreased light transmission of the display device.

According to an embodiment of the present disclosure, there is provided a resin composition including:
 a first polymer; and
 a polymer-modified whisker dispersed within the first polymer, the polymer-modified whisker including a whisker and a second polymer attached to a surface of the whisker;
 wherein the first polymer is a lipophilic polymer, and the second polymer is a lipophilic polymer.

According to an embodiment of the present disclosure, there is further provided a polarizer including a resin layer including a resin composition. The resin composition includes a first polymer and a polymer-modified whisker dispersed within the first polymer. The polymer-modified whisker includes a whisker and a second polymer attached to a surface of the whisker. The first polymer is a lipophilic polymer, and the second polymer is a lipophilic polymer. The first polymer is a lipophilic polymer, and the second polymer is a lipophilic polymer.

According to an embodiment of the present disclosure, there is further provided a display device including a display panel and a polarizer located on a light-outgoing side of the display panel. The polarizer includes a resin layer including a resin composition. The resin composition includes a first polymer and a polymer-modified whisker dispersed within the first polymer. The polymer-modified whisker includes a whisker and a second polymer attached to a surface of the whisker. The first polymer is a lipophilic polymer, and the second polymer is a lipophilic polymer.

According to the embodiments of the present disclosure, the second polymer is attached to the whisker to obtain the polymer-modified whisker, and both the second polymer and the first polymer are a lipophilic polymer, thereby improving the dispersibility of the polymer-modified whisker in the resin composition, reducing the actual usage amount of the polymer-modified whisker when the resin composition is applied to the polarizer, reducing loss of light emitted from the display device, while improving the chromaticity viewing angle of the display device.

BRIEF DESCRIPTION OF THE DRAWINGS

The accompanying drawings to be used for the illustration of embodiments will be described briefly below to clearly describe the embodiments of the present disclosure. It is apparent that the accompanying drawings below are illustrative only for some of the embodiments of the present disclosure, and other drawings may be made to those skilled in the art without involving any inventive effort based on these drawings.

DETAILED DESCRIPTION OF THE EMBODIMENTS

Figure 1:
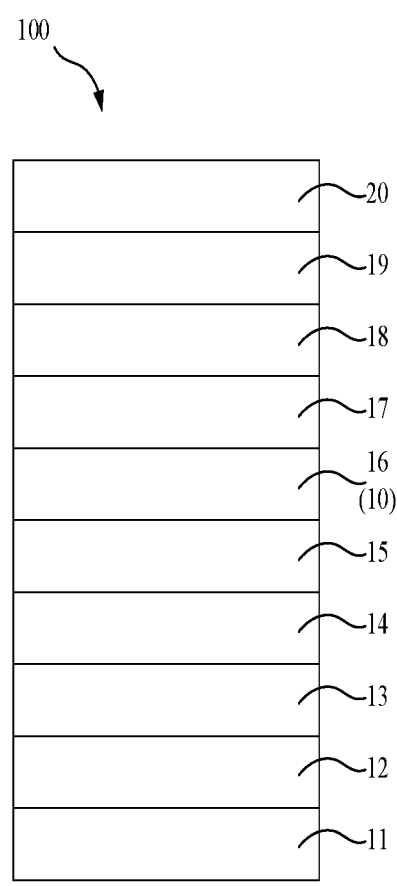
FIG. 1 is a schematic diagram of a first structure of a polarizer according to an embodiment of the present disclosure.

Embodiments of the present disclosure will be described below with reference to the accompanying drawings. It is apparent that the described embodiments are merely a part of the embodiments of the present disclosure, rather than all of the embodiments. All other embodiments obtained by a person skilled in the art based on these embodiments, without involving any inventive effort, are within the scope of the present disclosure. In addition, it is to be understood that the specific embodiments described herein are merely illustrative and explanatory, and are not intended to limit the present disclosure. In the present disclosure, without stating on the contrary, the orientation terms such as "up" or "down" are generally used to refer to the up and down position under the actual use or working condition of the device, specifically the direction shown in the accompanying drawings, and the terms such as "inside" or "outside" generally are used relative to the outline of the device.

At present, there are problems that the light-diffusing particles have poor dispersibility in the functional layer for enlarging the chromaticity viewing angle, resulting in aggregation thereof in the functional layer, increased actual usage amount of the light-diffusing particles and decreased light transmission rate of the display device.

An embodiment of the present disclosure provides a resin composition, which comprises a first polymer and a polymer-modified whisker dispersed within the first polymer. The polymer-modified whisker comprises a whisker and a second polymer attached to a surface of the whisker. The first polymer is a lipophilic polymer, and the second polymer is a lipophilic polymer.

According to the embodiment of the present disclosure, the second polymer is attached to the surface of the whisker to form the polymer-modified whisker, and both the second polymer and the first polymer are lipophilic polymers, thereby improving dispersibility of the polymer-modified whisker in the resin composition. When the resin composition is applied to a polarizer, the actual usage amount of the polymer-modified whisker can be reduced. In addition, the chromaticity viewing angle of the display device can be improved, while loss of light emitted from the display device may be reduced.

According to an embodiment of the present disclosure, the first polymer is a lipophilic polymer, and the second polymer is a lipophilic polymer, so that the polymer-modified whisker may have improved lipophilicity on the surface thereof, and thus more easily be dispersed in the first polymer. The lipophilicity of the first polymer, the second polymer, and the polymer-modified whisker can be determined by a surface tension test, a contact angle test, a wettability test, or the like.

Specifically, the dispersibility of the polymer-modified whisker in the first polymer is larger than that of an unmodified whisker in the first polymer. That is, when the unmodified whisker is dispersed in a first mass of the first polymer, an added amount of the unmodified whisker at the time of aggregation occurring is a second mass; when the polymer-modified whisker is dispersed in the first mass of the first polymer by a same dispersing process, the added amount of the polymer-modified whisker at the time of aggregation occurring is a third mass. A mass of the whisker included in the third mass of the polymer-modified whisker is greater than the second mass. In other words, more polymer-modified whisker can be dispersed in the same mass of the first polymer than the unmodified whisker under no aggregation occurs.

In some embodiments, the whisker is at least one of a first type whisker, a second type whisker, a third type whisker, a fourth type whisker, or a fifth type whisker.

The first type whisker, the second type whisker, the third type whisker, the fourth type whisker, and the fifth type whisker have different shapes.

In some embodiments, a change in a diameter of the whisker represents the magnitude of the change in the diameter of the whisker along an extension direction of a long axis of the whisker. The whisker has a first end and a second end along the extension direction of the long axis of the whisker. The first end of the whisker is sequentially connected to the second end of the whisker. Alternatively, the whisker further includes a middle section for connecting the first end to the second end. The middle section of the whisker is a portion that has a uniform diameter. That is, the change in a diameter of the middle section of the whisker is less than or equal to 1 micron along the extension direction of the long axis of the whisker. The first and second ends of the whisker may be portions that may have a larger change in diameter.

In some embodiments, a change in a diameter of the first type whisker is less than or equal to 0.3 microns along an extension direction of a long axis of the first type whisker, for example, may be 0 microns, 0.28 microns, 0.25 microns, 0.22 microns, 0.2 microns, 0.18 microns, 0.15 microns, 0.12 microns, 0.1 microns, 0.08 microns, 0.05 microns, 0.02 microns, or the like. In some embodiments, along the extension direction of the long axis of the first type whisker, a diameter of the first end is same as that of the middle section, and a diameter of the second end is same as that of the middle section.

In some embodiments, the first type whisker may have a rod-like shape. When the first type whisker is of a rod-like shape, it has a circular or elliptical cross-section in a plane perpendicular to the long axis of the first type whisker. When an orthographic projection of the first type whisker on the plane perpendicular to the long axis of the first type whisker has an elliptical shape, the diameter of the first type whisker is equal to a length of a long axis of the elliptical shape, and a ratio of the long axis of the elliptical shape to a short axis thereof is greater than 1 and less than or equal to 3, for example, may be 1.2, 1.5, 1.8, 2, 2.2, 2.5, 2.8, or the like.

In some embodiments, along an extension direction of a long axis of the second type whisker, a change in a diameter of a middle section of the second type whisker is less than or equal to 1 micron, for example, may be 0 microns, 0.95 microns, 0.8 micron, 0.78 micron, 0.75 microns, 0.72 microns, 0.7 microns, 0.68 microns, 0.65 microns, 0.62 microns, 0.6 microns, 0.58 microns, 0.55 microns, 0.52 microns, 0.5 microns, 0.48 microns, 0.45 microns, 0.42 microns, 0.4 microns, 0.38 microns, 0.35 microns, 0.32 microns, 0.3 microns, 0.28 microns, 0.25 microns, 0.22 microns, 0.2 microns, 0.18 microns, 0.15 microns, 0.12 microns, 0.1 microns, 0.08 microns, 0.05 microns, 0.02 microns, or the like. Along a direction away from the middle section of the second type whisker, a diameter of a first end of the second type whisker gradually decreases, and a change in a diameter of a second end of the second type whisker is less than or equal to 1 micron, for example, may be 0 microns, 0.95 microns, 0.8 microns, 0.78 microns, 0.75 microns, 0.72 microns, 0.7 microns, 0.68 microns, 0.65 microns, 0.62 microns, 0.6 microns, 0.58 microns, 0.55 microns, 0.52 microns, 0.5 microns, 0.48 microns, 0.45 microns, 0.42 microns, 0.4 microns, 0.38 microns, 0.35 microns, 0.32 microns, 0.3 microns, 0.28 microns, 0.25 microns, 0.22 microns, 0.2 microns, 0.18 microns, 0.15 microns, 0.12 microns, 0.1 microns, 0.08 microns, 0.05 microns, 0.02 microns, or the like. In some embodiments, along the direction away from the middle section of the second type whisker, the diameter of the first end of the second type whisker gradually decreases, and the diameter of the second end of the second type whisker is same as that of the middle section thereof.

In some embodiments, the second type whisker may have a needle-like shape with reduced diameters at one end.

In some embodiments, an orthographic projection of the second type whisker on a plane perpendicular to the long axis of the second type whisker may be of a circular or elliptical shape. When an orthographic projection of the second end or the middle section of the second type whisker on the plane perpendicular to the long axis of the second type whisker forms an elliptical shape, a ratio of a long axis of the elliptical shape to the short axis thereof is greater than 1 and less than or equal to 3, for example, may be 1.2, 1.5, 1.8, 2, 2.2, 2.5, 2.8, or the like. The cross-section of the first end of the second type whisker in any plane perpendicular to the long axis of the second type whisker has a shape that coincides with that of the cross-section of the middle section of the second type whisker in any plane perpendicular to the long axis of the second type whisker, and has gradually decreased area in the direction away from the middle section of the second type whisker.

In some embodiments, along an extension direction of a long axis of the third type whisker, a change in a diameter of a middle section of the third type whisker is less than or equal to 1 micron, for example, may be 0 microns, 0.95 microns, 0.8 microns, 0.78 microns, 0.75 microns, 0.72 microns, 0.7 microns, 0.68 microns, 0.65 microns, 0.62 microns, 0.6 microns, 0.58 microns, 0.55 microns, 0.52 microns, 0.5 microns, 0.48 microns, 0.45 microns, 0.42 microns, 0.4 microns, 0.38 microns, 0.35 microns, 0.32 microns, 0.3 microns, 0.28 microns, 0.25 microns, 0.22 microns, 0.2 microns, 0.18 microns, 0.15 microns, 0.12 microns, 0.1 microns, 0.08 microns, 0.05 microns, 0.02 microns, or the like. In a direction away from the middle section of the third type whisker, a diameter of a first end of the third type whisker gradually decreases, and a diameter of a second end of the third type whisker gradually decreases. In some embodiments, along the extension direction of the long axis of the third type whisker, the diameter of the middle section of the third type whisker is uniform, and the diameters of the first and second ends of the third type whisker gradually change.

In some embodiments, the third type whisker may have a needle-like shape with reduced diameters at both ends.

In some embodiments, an orthographic projection of the third type whisker on a plane perpendicular to the long axis of the third type whisker may have a circular or elliptical shape. When an orthographic projection of the middle section of the third type whisker on the plane perpendicular to the long axis of the third type whisker has an elliptical shape, a ratio of a long axis of the elliptical shape to a short axis thereof may be greater than 1 and less than or equal to 3, for example, may be 1.2, 1.5, 1.8, 2, 2.2, 2.5, 2.8, or the like. A cross-section of the first end or the second end of the third type whisker in any plane perpendicular to the long axis of the third type whisker has a shape that is same as that of a cross-section of the middle section of the third type whisker in any plane perpendicular to the long axis of the third type whisker, and has gradually decreased area in the direction away from the middle section of the third type whisker.

In some embodiments, a first end of the fourth type whisker is sequentially connected to a second end of the fourth type whisker, and a diameter of the fourth type whisker gradually decreases in a direction from the first end of the fourth type whisker toward the second end thereof.

In some embodiments, the fourth type whisker may have a long taper shape.

The fourth type whisker has a circular or elliptical cross-section in a plane perpendicular to a long axis of the fourth type whisker. In the direction from the first end of the fourth type whisker toward the second end thereof, the cross-section of the fourth type whisker in the plane perpendicular to the long axis of the fourth type whisker has a uniform shape and gradually decreases in area. When the cross-section of the fourth type whisker in the plane perpendicular to the long axis of the fourth type whisker has an elliptical shape, a diameter of the fourth type whisker is equal to a length of a long axis of the elliptical shape, and a ratio of the long axis of the elliptical shape to a short axis thereof is greater than 1 and less than or equal to 3, for example, may be 1.2, 1.5, 1.8, 2, 2.2, 2.5, 2.8, or the like.

In some embodiments, a first end of the fifth type whisker is sequentially connected to a second end of the fifth type whisker. A diameter of the first end of the fifth type whisker gradually decreases in a direction away from the second end of the fifth type whisker, and a diameter of the second end of the fifth type whisker gradually decreases in a direction away from the first end of the fifth type whisker.

In some embodiments, the fifth type whisker may have a bi-conical shape.

The fifth type whisker has a circular or elliptical cross-section in a plane perpendicular to a long axis of the fifth type whisker. In the direction away from the second end of the fifth type whisker, a cross-section of the first end of the fifth type whisker in the plane perpendicular to the long axis of the fifth type whisker has a uniform shape and gradually decreases in area. In the direction away from the first end of the fifth type whisker, a cross-section of the second end of the fifth type whisker in the plane perpendicular to the long axis of the fifth type whisker has a uniform shape and gradually decreases in area. When the cross-section of the fifth type whisker in the plane perpendicular to the long axis of the fifth type whisker has an elliptical shape, a diameter of the fifth type whisker is equal to a length of a long axis of the elliptical shape, and a ratio of the long axis of the elliptical shape to a short axis thereof is greater than 1 and less than or equal to 3, for example, may be 1.2, 1.5, 1.8, 2, 2.2, 2.5, 2.8, or the like.

In some embodiments, when the whisker is one selected from the first type whisker, the second type whisker, the third type whisker, the fourth type whisker, or the fifth type whisker, the whisker is preferably the third type whisker, so that the second polymer can advantageously be attached to and wrap the surface of the whisker uniformly to better enhance the dispersibility of the polymer-modified whisker in the first polymer, thereby further reducing the actual usage amount of the polymer-modified whisker, and reducing loss of light emitted from the display device while improving the chromaticity viewing angle of the display device.

In some embodiments, the whisker is at least two selected from the first type whisker, the second type whisker, the third type whisker, the fourth type whisker, or the fifth type whisker. Preferably, the whisker is a mixture of the first type whisker, the second type whisker, and the third type whisker, or a mixture of the first type whisker, the fourth type whisker, and the fifth type whisker, or a mixture of the first type whisker, the second type whisker, the third type whisker, the fourth type whisker, and the fifth type whisker. Selecting at least two whisker particles of different shapes can increase a shape diversity of the whisker, increase an optical anisotropy of the whisker, and improve an enhancement effect of the whisker on the contrast and brightness.

In some embodiments, when the whisker is selected from the first type whisker, the second type whisker, or the third type whisker, or the whisker is selected from the first type whisker, the fourth type whisker, or the fifth type whisker, or the whisker is a mixture of the first type whisker, the second type whisker, the third type whisker, the fourth type whisker, and the fifth type whisker, a mass fraction of the first type whisker in the total whisker is from 1% to 8%, for example, may be 1.5%, 2%, 2.5%, 3%, 3.5%, 4%, 4.5%, 5%, 6%, 6.5%, 7%, 7.5%, or the like; a mass fraction of the second type whisker and/or the fourth type whisker in the total whisker is form 40% to 50%, for example, may be 41%, 42%, 43%, 44%, 45%, 46%, 47%, 48%, 49%, or the like; a mass fraction of the third type whisker and/or the fifth type whisker in the total whisker is from 45% to 55%, for example, may be 46%, 47%, 48%, 49%, 50%, 51%, 52%, 53%, 54%, or the like. The first type whisker, the second type whisker and/or the fourth type whisker, and the third type whisker and/or the fifth type whisker are mixed in the above ratios, thereby facilitating to further improve an enhancement effect of the obtained polymer-modified whisker on contrast and brightness.

In some embodiments, a mass fraction of the polymer-modified whisker in the resin composition is from 1% to 26%, for example, 1.5%, 2%, 2.5%, 3%, 3.5%, 4%, 4.5%, 5%, 8%, 10%, 13%, 15%, 18%, 20%, 23%, 25%, or the like, which facilitates a significant light diffusion effect while preventing the light transmittance of the resin composition from being influenced.

In some embodiments, a length of the long axis of the whisker is a spacing between two ends of the long axis of the whisker along a direction of the long axis of the whisker. The long axis of the whisker is greater than or equal to 10 microns and less than or equal to 30 microns. For example, the length of the long axis of the whisker may be 12 microns, 15 microns, 18 microns, 20 microns, 22 microns, 25 microns, 28 microns, 30 microns, or the like. When the length of the long axis of the whisker is within the above range, the long axis of the whisker is easily oriented so that the polymer-modified whisker is easily oriented.

In some embodiments, the whisker has a minimum diameter greater than or equal to 0.5 microns, and a maximum diameter less than or equal to 2 microns. For example, the diameter of the whisker may be 0.6 microns, 0.7 microns, 0.8 microns, 0.9 microns, 1 micron, 1.2 microns, 1.5 microns, 1.8 microns, 2 microns, or the like, which facilitates to obtain an aspect ratio that causes more light to change its direction of propagation by a surface of a long axis of the polymer-modified whisker.

In some embodiments, the whisker is at least one selected from the group consisting of silicon dioxide, silicon carbide, silicon nitride, zinc oxide, magnesium oxide, aluminum oxide, calcium sulfate, calcium carbonate, potassium titanate, and aluminum borate.

In some embodiments, the surface of the whisker is modified with at least one of an inorganic cation, an inorganic anion, a coupling agent, or a surfactant. That is, the surface of the whisker is attached with at least one of an inorganic cation group, an inorganic anion group, a coupling agent group, or a surfactant group.

In some embodiments, the surface of the whisker is modified with at least one of an inorganic magnesium salt, an inorganic calcium salt, an inorganic barium salt, an inorganic strontium salt, stearic acid, stearate, a sulfonic surfactant, a thio surfactant, titanate, aluminate, silane, alkyl phosphate, aryl phosphate, alkyl alcohol amide phosphate, imidazoline phosphate, polyphosphate, or siloxane phosphate. Specifically, the surface of the whisker is modified with at least one selected from the group consisting of magnesium chloride, calcium chloride, barium chloride, strontium chloride, stearic acid, sodium stearate, zinc stearate, a sulfonic surfactant, a thio surfactant, titanate, aluminate, silane, alkyl phosphate, aryl phosphate, alkyl alcohol amide phosphate, imidazoline phosphate, polyphosphate, and siloxane phosphate. Preferably, the surface of the whisker is modified with at least one of a sulfonic surfactant or a thio surfactant. The sulfonic surfactant may be at least one selected from the group consisting of alkyl sulfonate and fluoroalkyl sulfonate, and specifically, at least one of sodium dodecyl sulfonate, sodium dodecyl benzene sulfonate, or sodium fluorododecyl sulfonate. The thio surfactant may be at least one selected from the group consisting of thiol and fluoro-thiol, specifically, at least one of octanethiol, dodecanethiol, tetradecanethiol, octadecanethiol, fluoro-octanethiol, or fluoro-dodecanethiol. When the sulfonic surfactant is mixed with the whisker to be surface-modified, the sulfonic surfactant group forms a sulfonic shell layer on the surface of the whisker, such as a benzene ring sulfonic shell layer, which is favorable for protecting the whisker, enhancing the toughness of the whisker, and reducing the fracture of the polymer-modified whisker formed by the whisker in the first resin composition. When the thio surfactant group is mixed with the whisker to be surface-modified, the thio surfactant group may form an O—S—O cross-linked network with a hydroxyl group on the surface of the whisker. The O—S—O bond energy is relatively large, which facilitates protection of the whisker in the process of further attaching the second polymer to the surface of the whisker and mixing with the first polymer to form the resin composition, reduces fracture of the polymer-modified whisker, and improves the optical function such as contrast and brightness of the polymer-modified whisker. More preferably, the surface of the whisker is modified with at least one of a fluorine substituent-containing sulfonic surfactant, or a fluorine substituent-containing thio surfactant, in particular, at least one of sodium fluorododecyl sulfonate, fluoro-octanethiol, or fluoro-dodecylthiol. The fluorine atom has high stability in the alkyl chain. The bond energy of a carbon-fluorine bond is higher than that of a carbon-carbon bond, and the carbon-fluorine bond has a shielding effect on the carbon-carbon bond, thereby facilitating protection of the carbon-carbon bond, and improving the stability of the whisker. Further, after the surface of the whisker is modified by at least one of an inorganic cation, an inorganic anion, a coupling agent, or a surfactant, the richness of the surface groups of the whisker may be increased, thereby increasing the attachment sites of the second polymer, and increasing the diversity of polymer materials suitable for the second polymer.

In some embodiments, the second polymer includes at least one of a polyacrylate group, an acrylate-acrylic acid copolymer group, a water-soluble comb polycarboxylic copolymer group, or a polydimethylsiloxane group. Specifically, in some embodiments, the second polymer is at least one selected from the group consisting of polyacrylate, an acrylate-acrylic acid copolymer, a water-soluble comb polycarboxylic copolymer, and polydimethylsiloxane.

In some embodiments, the polyacrylate group may be at least one selected from the group consisting of a poly(methyl methacrylate) group, a poly(glycidyl methacrylate) group, a poly(2-hydroxyethyl methacrylate) group, a poly(methyl acrylate) group, a poly(ethyl acrylate) group, a poly(butyl acrylate) group, and poly(2-ethylhexyl acrylate) group.

In some embodiments, the water-soluble comb polycarboxylic copolymer may be a graft polymer formed from comonomers such as polyoxyethylene methyl allyl diether, maleic anhydride, and styrene. A group of the water-soluble comb polycarboxylic copolymer may include a polyoxyethylene methyl allyl diether group, a poly(maleic anhydride) group, or a polystyrene group.

In some embodiments, a monomer for forming the second polymer has a molecular weight greater than or equal to 50 and less than or equal to 500.

In some embodiments, the second polymer includes a group identical to the first polymer. Alternatively, the surface of the polymer-modified whisker includes a group identical to a homologue of the first polymer. Specifically, in some embodiments, the second polymer is same as the first polymer. Alternatively, the second polymer is a homologue of the first polymer. The surface of the polymer-modified whisker is provided to include a group identical to the first polymer or a homologue of the first polymer, so that it may facilitate to further enhance the dispersibility of the polymer-modified whisker in the resin composition, thereby reducing the actual usage amount of the polymer-modified whisker, and reducing the loss of light emitted from the display device while improving the chromaticity viewing angle of the display device.

A process of forming the polymer-modified whisker by attaching the second polymer to the surface of the whisker may be at least one of a physical process or a chemical process. The physical process may be at least one of a sol-gel method, a precipitation method, or a plasma treatment. The chemical process may be at least one of a heterogeneous condensation, gas-phase grafting, radiation grafting, high-temperature grafting, photo-induced grafting, melt grafting, solution grafting, solid-phase grafting, microencapsulation, or a chemical vapor deposition method. The second polymer may be bonded via a side chain group thereof to a radical on the surface of the whisker, for example, by forming a chemical bond or a hydrogen bond to attach to the surface of the whisker. A backbone of the second polymer has a length such that the whisker is wrapped by at least part of the second polymer, preferably by the entire second polymer. The second polymer is more dispersible than the whisker in the first polymer so that the polymer-modified whisker is more dispersible than the whisker in the first polymer.

In some embodiments, the first polymer may be at least one selected from the group consisting of polymethyl methacrylate, polymethyl acrylate, polyethyl acrylate, polybutyl acrylate, poly(2-ethylhexyl acrylate), cellulose triacetate, polyethylene terephthalate, polycarbonate, polyethylene naphthalate, and polycycloolefin.

According to an embodiment of the present disclosure, the polymer-modified whisker is provided by attaching the second polymer to the surface of the whisker, and both of the first polymer and the second polymer are lipophilic polymers. The dispersibility of the polymer-modified whisker in the resin composition is improved. When the resin composition is applied to the polarizer, the actual usage amount of the polymer-modified whisker is reduced. The loss of light emitted from the display device is reduced, while the chromaticity viewing angle of the display device is improved.

Referring to FIGS. 1-5, an embodiment of the present disclosure further provides a polarizer including the resin composition as described above.

According to embodiments of the present disclosure, there is provided a resin layer including a resin composition, in which a second polymer is attached to a surface of a whisker to obtain the polymer-modified whisker. The polymer-modified whisker has an improved dispersibility in the resin composition, and a usage amount of the polymer-modified whisker may be reduced. In this case, a display device to which the polarizer is applied has an improved chromaticity viewing angle, while loss of light emitted from the display device can be reduced.

In some embodiments, the resin layer is formed from the resin composition as described above.

In some embodiments, the polarizer further includes a polarizing layer, and the resin layer is located on a side of the polarizing layer. Alternatively, the resin layer is the polarizing layer.

In some embodiments, an orthographic projection of a long axis of the polymer-modified whisker of the resin layer on a first plane has a first orientation angle, and an orthographic projection of an absorption axis of the polarizing layer on the first plane has a second orientation angle. The average difference between the first orientation angle and the second orientation angle is greater than or equal to −15° and less than or equal to 15°. The first plane is parallel to a plane in which the polarizing layer is located. The long axis of the polymer-modified whisker is parallel to or overlaps the long axis of the whisker. The average difference between the first orientation angle and the second orientation angle may be −0.15°, −1°, −1.3°,−1.15°,−1.8°,−2°,−2.3°,−2.15°,−2.8°, −3°,−3.3°,−3.15°,−3.8°, −4°,−4.3°,−4.15°, −4.8°,−5°,−5.5°,−6°,−6.5°, −7°,−8°, −9°,−10°, −11°, −12°, −13°, −14°, 0°, 0.15°, 1°, 1.3°, 1.15°, 1.8°, 2°, 2.3°, 2.15°, 2.8°, 3°, 3.3°, 3.15°, 3.8°, 4°, 4.3°, 4.15°, 4.8°, 5°, 5.5°, 6°, 6.5°, 7°, 8°, 9°, 10°, 11°, 12°, 13°, 14°, or the like. An absolute value of the angle difference between the first orientation angle and the second orientation angle is set to be less than or equal to 15°, thereby facilitating more light to change its direction of propagation via the polymer-modified whisker, and improving the chromaticity viewing angle and the contrast.

In some embodiments, an included angle is formed between the long axis of the polymer-modified whisker and the first plane. The included angle may be an acute angle that has a angle value less than or equal to 40°, for example, may be 2°, 5°, 8°, 10°, 12°, 15°, 18°, 20°, 22°, 25°, 28°, 30°, 32°, 35°, 38°, 40°. The long axis of the polymer-modified whisker is spatially angled to the first plane, so that it facilitates further changing the direction of propagation of more light via the polymer-modified whisker, thereby improving the chromaticity viewing angle and contrast.

In some embodiments, an orthographic projection of the long axis of the polymer-modified whisker on a second plane has a third orientation angle, and an orthographic projection of the absorption axis of the polarizing layer on the second plane has a fourth orientation angle. An average difference between the third orientation angle and the fourth orientation angle is greater than or equal to −15° and less than or equal to 15°. The second plane is perpendicular to a plane in which the polarizing layer is located. The second plane is not perpendicular to the absorption axis of the polarizing layer. The second plane is not perpendicular to the long axis of the polymer-modified whisker. An absolute value of an average difference between the third orientation angle and the fourth orientation angle is set to be less than or equal to 15°, so that the long axis of the polymer-modified whisker maintains spatially approximately parallel to the absorption axis of the polarizing layer. This facilitates to further change the direction of propagation of more light via the polymer-modified whisker, thereby improving the chromaticity viewing angle and the contrast. The average difference between the third orientation angle and the fourth orientation angle may be −0.15°, −1°,−1.3°,−1.15°,−1.8°,−2°, −2.3°,−2.15°,−2.8°, −3°, −3.3°,−3.15°,−3.8°,−4°, −4.3°, −4.15°,−4.8°,−5°,−5.5°,−6°,−6.5°, −7°,−8°, −9°,−10°, −11°, −12°, −13°, −14°, 0°, 0.15°, 1°, 1.3°, 1.15°, 1.8°, 2°, 2.3°, 2.15°, 2.8°, 3°, 3.3°, 3.15°, 3.8°, 4°, 4.3°, 4.15°, 4.8°, 5°, 5.5°, 6°, 6.5°, 7°, 8°, 9°, 10°, 11°, 12°, 13°, 14°, or the like.

In some embodiments, the average difference between the first orientation angle and the second orientation angle is greater than or equal to −15° and less than or equal to 15°. That is, with the second orientation angle being 0°, the average difference between the first orientation angle and the second orientation angle is greater than or equal to −15° and less than or equal to 15°. The average difference between the third orientation angle and the fourth orientation angle is greater than or equal to −15° and less than or equal to 15°. That is, with the fourth orientation angle being 0°, the average difference between the third orientation angle and the fourth orientation angle is greater than or equal to −15° and less than or equal to 15°. The average difference between the first orientation angle and the second orientation angle, or between the third orientation angle and the fourth orientation angle in the resin layer may be obtained by photographing the resin layer using an optical microscope, and performing statistical analysis with an existing program.

In some embodiments, the polarizer further includes a first protection layer. When the resin layer is located on a side of the polarizing layer, the resin layer is located between the first protection layer and the polarizing layer. Alternatively, when the resin layer is located on a side of the polarizing layer, the resin layer is located on a side of the first protection layer away from the polarizing layer.

In some embodiments, the polarizer further includes a first protection layer and a hard coating layer. When the resin layer is located on a side of the polarizing layer, the resin layer is located on a side of the first protection layer away from the polarizing layer, and the hard coating layer is located on a side of the resin layer away from the first protection layer.

In some embodiments, the resin layer is located on a side of the polarizing layer. The polarizer further includes a first protection layer and a hard coating layer. The first protection layer is located between the polarizing layer and the hard coating layer. The resin layer is any one of the first protection layer or the hard coating layer.

Specifically, according to some embodiments of the present disclosure, the polarizer 100 includes a first protection layer, a second protection layer, and a polarizing layer. The first protection layer and the second protection layer are disposed on opposite sides of the resin layer 10, respectively. Optionally, the resin layer 10, as an adhesive layer, is configured to bond the first protection layer and the second protection layer. The polarizing layer is disposed on a side of the first protection layer facing away from the resin layer 10. Optionally, the polarizer 100 further includes an adhesive layer. The first protection layer and the second protection layer are respectively disposed on opposite sides of the resin layer 10. The adhesive layer bonds the first protection layer and the resin layer 10, and the polarizing layer is disposed on a side of the first protection layer facing away from the resin layer 10.

FIG. 1 illustrates an embodiment of the present disclosure in which the resin layer 10 serves as the adhesive layer. The polarizer 100 includes a release film 11, a first pressure-sensitive adhesive layer 12, an optical compensation layer 13, a polarizing layer 14, a first protection layer 15, a second pressure-sensitive adhesive layer 16, a second protection layer 17, a hard coating layer 18, an anti-reflection layer 19, and a surface protection layer 20, which are sequentially stacked. In the use state of the polarizer 100, the direction from the release film 11 to the surface protection layer 20 is a stacking direction of film layers of the polarizer 100, and also the incident direction of light.

The release film 11 is configured to protect the pressure-sensitive adhesive layer from damage before the polarizer 100 is attached to the liquid crystal display panel, so as to avoid the generation of bubbles during attaching. The release film 11 may be a polyester film such as a polyethylene terephthalate film, a polyolefin film such as a polyethylene film or a polypropylene film, a polytetrafluoroethylene-based film, or a release-treated film by a siloxane-based resin, a melamine-based resin, or a urea-based resin, so that the release film 11 is easily peeled off.

The first pressure-sensitive adhesive (PSA) layer 12 is disposed on a side of the release film 11. The first pressure-sensitive adhesive layer 12 is the adhesive layer for adhering the release film 11 to other film layers such as the polarizing layer 14 on the release film 11. A material of the first pressure-sensitive adhesive layer 12 may be, for example, an acrylate resin.

The optical compensation layer 13 is disposed on a side of the first pressure-sensitive adhesive layer 12 facing away from the release film 11. The optical compensation layer 13 may be a compensation layer or a phase difference film or the like in which a liquid crystalline compound is coated on a surface of the protection layer and oriented and fixed.

The polarizing layer 14 is disposed on a side of the optical compensation layer 13 facing away from the first pressure-sensitive adhesive layer 12. The polarizing layer 14 may comprise polyvinyl alcohol. Specifically, the polarizing layer 14 may comprise a polyvinyl alcohol film dyed with iodine or a polyene compound obtained by dewatering the polyvinyl alcohol film.

The first protection layer 15 is disposed on a side of the polarizing layer 14 facing away from the optical compensation layer 13. The first protection layer 15 serves to protect the polarizing layer 14 and support film layers above the first protection layer 15. The first protection layer 15 may comprise at least one material selected from the group consisting of a cellulose ester resin including triacetylcellulose (TAC), a cyclic polyolefin resin including an amorphous cyclic polyolefin (COP), a polycarbonate resin, a polyester resin including polyethylene terephthalate (PET), a polyethersulfone resin, a polysulfone resin, a polyamide resin, a polyimide resin, an acyclic polyolefin resin, a polyacrylate resin including a poly(methyl methacrylate) resin, a polyvinyl alcohol resin, a polyvinyl chloride resin, and a polyvinylidene chloride resin, but not limited thereto. Specifically, the material of the first protection layer 15 is PET.

The second pressure-sensitive adhesive layer 16 is disposed on a side of the first protection layer 15 facing away from the polarizing layer 14. The second pressure-sensitive adhesive layer 16 functions in the same way as the first pressure-sensitive adhesive layer 12 and also is an adhesive layer. The second pressure-sensitive adhesive layer 16 is configured to bond the first protection layer 15 and the second protection layer 17. A material of the second pressure-sensitive adhesive layer 16 may be selected from ingredients described with regard to the first pressure-sensitive adhesive layer 12, and the repeated detail is omitted here.

In the embodiment, the polymer-modified whisker is disposed in the second pressure-sensitive adhesive layer 16. In this case, the resin layer 10 corresponds to the second pressure-sensitive adhesive layer 16.

The second protection layer 17 is disposed on a side of the second pressure-sensitive adhesive layer 16 facing away from the first protection layer 15. The second protection layer 17 is configured to support film layers above the second protection layer 17. A material of the second protection layer 17 may be selected from ingredients described with regard to the first protection layer 15, and the repeated details thereof is omitted here. Specifically, the material of the second protection layer 17 is PET.

The hard coating layer 18 is disposed on a side of the second protection layer 17 facing away from the second pressure-sensitive adhesive layer 16. The hard coating layer 18 has performances such as high hardness, water resistance and oil resistance, and is capable of preventing a surface of the underlying film layer thereof from being scratched and is easier to clean. Optionally, the hard coating layer 18 has a higher glass transition temperature, for example, 70 degrees Celsius to 120 degrees Celsius. A material of the hard coating layer 18 may be selected from the group consisting of polyurethane resins, acrylate resins, epoxy resins, vinyl resins, and silicone resins.

The anti-reflection layer 19 (AR) is disposed on a side of the hard coating layer 18 facing away from the second protection layer 17. The anti-reflection layer 19 is configured to prevent reflection and scratch. The anti-reflection layer 19 is, for example, a dielectric film formed on the surface of the hard coating layer 18.

The surface protection layer 20 serves to protect film layers underneath. The surface protection layer 20 may be a transparent resin film made from a thermoplastic resin, for example, a polyolefin-based resin such as a linear polyolefin-based resin (polypropylene-based resin or the like) and a cyclic polyolefin-based resin (norbornene-based resin or the like); a cellulose ester-based resin such as cellulose triacetate and cellulose diacetate; a polyester-based resin such as polyethylene terephthalate, polyethylene naphthalate, and polybutylene terephthalate; a polycarbonate-based resin; a (meth) acrylate-based resin; or a mixture or copolymer thereof.

In addition to the above film layers, the polarizer 100 may have another film layer, for example, an antistatic layer, which will not be described herein.

Figure 2:
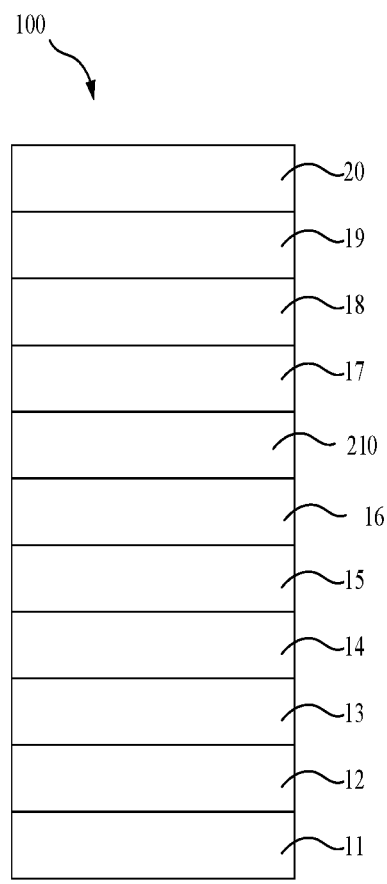
FIG. 2 is a schematic diagram of a second structure of a polarizer according to an embodiment of the present disclosure.

FIG. 2 illustrates a polarizer 100 according to an embodiment of the present disclosure, in which the first protection layer 15 is bonded to the resin layer 210 by an adhesive layer. The implementation as shown in FIG. 2 differs from that in FIG. 1 in that the polymer-modified whisker is not dispersed in the second pressure-sensitive adhesive layer 16, but an additional resin layer 210 is disposed on the second pressure-sensitive adhesive layer 16. The polymer-modified whisker is dispersed in the resin layer 210.

The material of the resin layer 10 may be selected from the group consisting of a polyurethane resin, an acrylate resin, an epoxy resin, a vinyl resin, and a silicone resin.

According to some embodiments of the present application, the polarizer 100 includes a first protection layer, a polarizing layer, and a hard coating layer. The first protection layer is disposed between the polarizing layer and the hard coating layer. The resin layer is any one of the first protection layer, the polarizing layer, or the hard coating layer.

Figure 3:
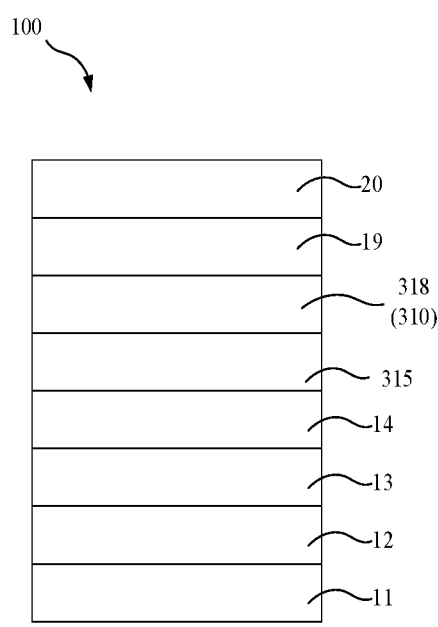
FIG. 3 is a schematic diagram of a third structure of a polarizer according to an embodiment of the present disclosure.

FIG. 3 illustrates a polarizer 100 according to an embodiment of the present disclosure, in which the resin layer 310 corresponds to the hard coating layer 318. The implementation as shown in FIG. 3 differs from that of FIG. 1 in that the polymer-modified whisker is not dispersed in the second pressure-sensitive adhesive layer, but is dispersed in the hard coating layer 318. In the embodiment, the second protection layer and the second pressure-sensitive adhesive layer may be omitted, and only a first protection layer 315 may be disposed. By omitting the second protection layer, it is possible to simplify the structure of the polarizer 100. In addition, by omitting one of the protection layers, the brightness and contrast of the polarizer 100 are improved.

Figure 4:
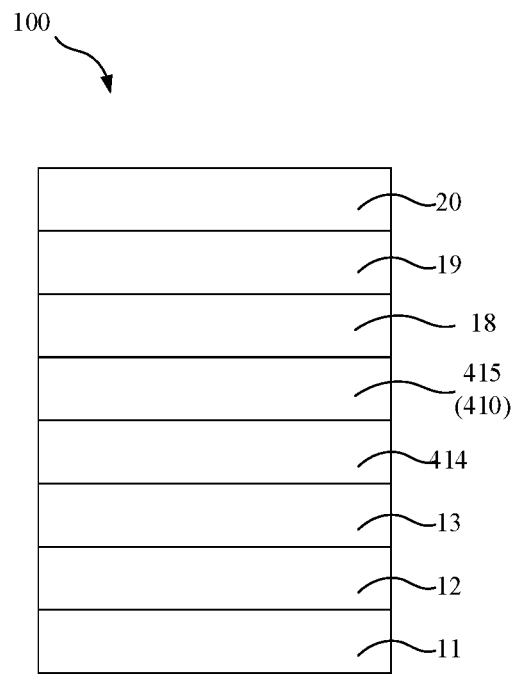
FIG. 4 is a schematic diagram of a fourth structure of a polarizer according to an embodiment of the present disclosure.

FIG. 4 illustrates a polarizer 100 according to an embodiment of the present disclosure, in which the resin layer 410 corresponds to the first protection layer 415. The implementation as shown in FIG. 4 differs from that of FIG. 3 in that the polymer-modified whisker is not dispersed in the hard coating layer 18, but is dispersed in the first protection layer 415. In the embodiment, only one first protection layer 415 may be provided. In this structure, the first protection layer 415 and the polarizing layer 414 may be made by a stretching process.

Figure 5:
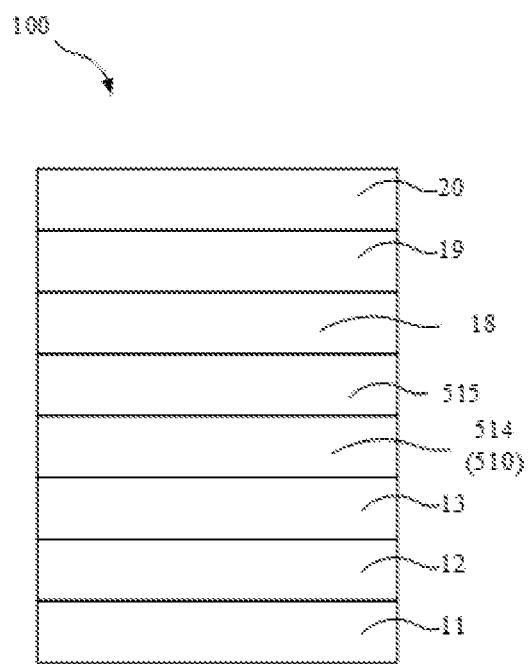
FIG. 5 is a schematic diagram of a fifth structure of a polarizer according to an embodiment of the present disclosure.

FIG. 5 illustrates a polarizer 100 according to an embodiment of the present disclosure, in which a resin layer 510 corresponds to a polarizing layer 514. The implementation as shown in FIG. 5 differs from that of FIG. 4 in that the polymer-modified whisker is not dispersed in the hard coating layer 18, but is dispersed in the polarizing layer 514. In the embodiment, only one first protection layer 515 may be provided. In this structure, the polarizing layer 514 may be made by a stretching process.

According to the embodiments of the present disclosure, the polarizer is provided to use the resin layer including the resin composition, in which the second polymer is attached to the surface of the whisker to obtain the polymer-modified whisker, so that the dispersion of the polymer-modified whisker in the resin composition is improved, the actual use amount of the polymer-modified whisker is reduced. In addition, the chromaticity viewing angle of the display device to which the polarizer is applied is improved, while the loss of light emitted from the display device is reduced.

Figure 6:
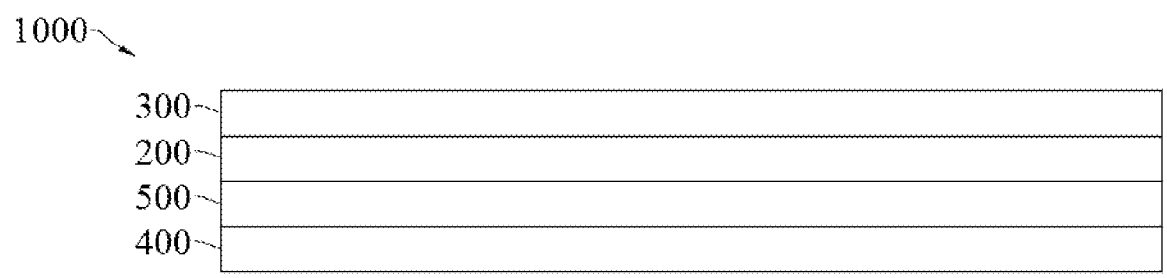
FIG. 6 is a schematic diagram of a structure of a display device according to an embodiment of the present disclosure.

Referring to FIG. 6, an embodiment of the present disclosure further provides a display device 1000.

The display device 1000 includes a display panel 200.

The display device 1000 further includes a first polarizer 300 on a light-outgoing side of the display panel 200. The first polarizer 300 is any one of the polarizers 100 described above.

In some embodiments, the display panel 200 may be a liquid crystal display panel, a spontaneous display panel, or the like. The spontaneous display panel may be an organic light-emitting diode (OLED) display panel, or the like.

In some embodiments, a first optical functional layer of the first polarizer 300 is located on a side of the polarizing layer of the first polarizer 300 away from the display panel.

When the display panel 200 is a liquid crystal display panel, the display device 1000 further includes a backlight module 400 on a side of the display panel 200 away from the first polarizer 300. The backlight module 400 is configured to provide light for the display panel 200. The display device 1000 further includes a second polarizer 500 located between the backlight module 400 and the display panel 200. The second polarizer 500 may or may not, be selected from the polarizers as described above.

Next, the present disclosure will be described in more detail with reference to some examples. It is to be noted, however, that these examples are provided for purposes of illustration only and should not be construed as limiting the present disclosure in any way.

Example 1

A needle-like $CaCO_3$ whisker was used to prepare a slurry containing 6% by mass of $CaCO_3$ using ultrapure water. Sodium stearate was dissolved in an equal mass of absolute ethanol to provide sodium stearate and ethanol with the same mass fraction, and added into the $CaCO_3$ slurry at a temperature of 85° C. dropwise. In the mixture, the mass fraction of sodium stearate was 2%. The mixture was stirred with a stirrer for 1 h, filtered, washed with ultrapure water and absolute ethanol, and dried at a temperature of 110° C. to obtain the sodium stearate-modified whisker.

The sodium stearate-modified whisker is dissolved in an equal mass of anhydrous ethanol, and glycidyl methacrylate (to 3% by mass) and dibromoisobutyryl bromide (to 3.5% by mass) were added dropwise thereinto. After stirring at 60° C. for 45 min, cuprous bromide (to 1% by mass) as a catalyst and pentamethyldiethylenetriamine (PMDETA, to 3% by mass) were added dropwise, stirred at 60° C. for 80 min, filtered, washed with ultrapure water and anhydrous ethanol, and dried at 110° C. to obtain the polymer-modified whisker to the surface of which polyglycidyl methacrylate is attached.

The above polymer-modified whisker was incorporated at a mass fraction of 6% in a material for forming the second pressure-sensitive adhesive layer to form a resin composition. The resin composition was used to form a resin layer on the surface of the first protection layer. The resin layer had a thickness of 20 microns. The structure of the polarizer was shown in FIG. 1.

Comparative Example 1

In contrast to the Example 1, the obtained sodium stearate-modified whisker was incorporated at a mass fraction of 7% into a material for forming the second pressure-sensitive adhesive layer to form a comparative resin composition. The comparative resin composition was used to form on the surface of the first protection layer a comparative resin layer with a thickness of 25 microns, thereby obtaining a comparative polarizer. The structure of the comparative polarizer was the same as or similar to that of the polarizer obtained in Example 1, except that the resin layer of the Example 1 was replaced with the comparative resin layer of the comparative polarizer.

The polarizer obtained in Example 1 and the comparative polarizer obtained in Comparative Example 1 were respectively disposed on the light-outgoing side of the same type liquid crystal display module (which may have the same liquid crystal display panel, the same backlight module, and the same structure of polarizer located between the liquid crystal display panel and the backlight module), so as to obtain the chromaticity viewing angle, the transmittance, and the yield of the polarizer product, as shown in Table 1.

TABLE 1

| | Particle dosage | Optimal film thickness | Chromaticity viewing angle | Transmittance | Yield |
|---|---|---|---|---|---|
| Comparative Example 1 | 100% | 100% | 100% | 100% | 100% |
| Example 1 | 85.7% | 80% | 100% | 107% | 102% |

As can be seen from the results in Table 1, as compared to the sodium stearate-modified whisker, the polymer-modified whisker, which is formed by attaching a polymer to the surface of the sodium stearate-modified whisker, improves the dispersibility of the whisker and reduces aggregation in the resin layer due to the polymer attached to the surface of the whisker, so that when the same degree of chromaticity viewing angle is achieved, the amount of whisker particles is reduced, the light transmission of the display device is improved, and the product yield is also improved.

An embodiment of the present disclosure provides a resin composition, a polarizer, and a display device. The resin composition includes a first polymer and a polymer-modified whisker dispersed in the first polymer. The polymer-modified whisker includes a whisker and a second polymer attached to a surface of the whisker. The first polymer is a lipophilic polymer, and the second polymer is a lipophilic polymer. According to the present disclosure, the polymer-modified whisker is provided by attaching the second polymer to the surface of the whisker, and both of the second polymer and the first polymer are lipophilic polymers, so that the dispersibility of the polymer-modified whisker in the resin composition is improved. When the resin composition is used for the polarizer, the actual usage of the polymer-modified whisker can be reduced. In addition, the chromaticity viewing angle of the display device can be improved, while the loss of light emitted from the display device can be reduced.

The resin composition, the polarizer, and the display device according to embodiments of the present disclosure have been described in detail above. The principles and implementations of the present disclosure have been set forth herein using specific examples. The description of the above embodiments is merely provided to help understand the method of the present disclosure and the core idea thereof. In addition, variations may be made in the specific implementations and scope of application to those skilled in the art in accordance with the teachings of the present disclosure. In light of the foregoing, the present specification is not to be construed as limiting the present disclosure.

What is claimed is:

1. A resin composition comprised in a resin layer, wherein the resin layer is comprised in a polarizer, and the resin composition comprises:
a first polymer; and
a polymer-modified whisker dispersed in the first polymer, the polymer-modified whisker comprising an inorganic whisker and a second polymer attached to a surface of the inorganic whisker;
wherein the first polymer is a lipophilic polymer, and the second polymer is a lipophilic polymer.

2. The resin composition according to claim 1, wherein the inorganic whisker is at least one selected from a first type whisker, a second type whisker, a third type whisker, a fourth type whisker, or a fifth type whisker,
along an extension direction of a long axis of the first type whisker, a change in a diameter of the first type whisker is less than or equal to 0.3 microns;
along an extension direction of a long axis of the second type whisker, a change in a diameter of a middle section of the second type whisker is less than or equal to 1 micron; in a direction away from the middle section of the second type whisker, a diameter of a first end of the second type whisker gradually decreases, and a change in a diameter of a second end of the second type whisker is less than or equal to 1 micron;
along an extension direction of a long axis of the third type whisker, a change in a diameter of a middle section of the third type whisker is less than or equal to 1 micron; in a direction away from the middle section of the third type whisker, a diameter of a first end of the third type whisker gradually decreases, and a diameter of a second end of the third type whisker gradually decreases;
a first end of the fourth type whisker is sequentially connected to a second end of the fourth type whisker, and in a direction from the first end of the fourth type whisker toward the second end of the fourth type whisker, a diameter of the fourth type whisker gradually decreases;
a first end of the fifth type whisker is sequentially connected to a second end of the fifth type whisker, a diameter of a first end of the fifth type whisker gradually decreases in a direction away from the second end of the fifth type whisker, and a diameter of the second end of the fifth type whisker gradually decreases in a direction away from the first end of the fifth type whisker.

3. The resin composition according to claim 1, wherein a long axis of the inorganic whisker has a length greater than or equal to 10 microns and less than or equal to 30 microns; the inorganic whisker has a minimum diameter greater than or equal to 0.5 microns, and a maximum diameter less than or equal to 2 microns.

4. The resin composition according to claim 1, wherein the inorganic whisker is at least one selected from the group consisting of silicon dioxide, silicon carbide, silicon nitride, zinc oxide, magnesium oxide, aluminum oxide, calcium sulfate, calcium carbonate, potassium titanate, and aluminum borate.

5. The resin composition according to claim 1, wherein a surface of the inorganic whisker is modified with at least one of an inorganic cation, an inorganic anion, a coupling agent, or a surfactant.

6. The resin composition according to claim 1, wherein in the resin composition, a mass fraction of the polymer-modified whisker is greater than or equal to 1% and less than or equal to 26%.

7. The resin composition according to claim 1, wherein the second polymer comprises at least one of a polyacrylate group, an acrylate-acrylic acid copolymer group, a water-soluble comb polycarboxylic copolymer group, or a polydimethylsiloxane group.

8. The resin composition according to claim 1, wherein the first polymer is at least one selected from the group consisting of polymethyl methacrylate, polymethyl acrylate, polyethyl acrylate, polybutyl acrylate, poly(2-ethylhexyl acrylate), cellulose triacetate, polyethylene terephthalate, polycarbonate, polyethylene naphthalate, and polycycloolefin.

9. The resin composition according to claim 1, wherein the second polymer comprises a group that is same as that of the first polymer or a homologue of the first polymer.

10. The resin composition according to claim 9, wherein the second polymer is same as the first polymer or the homologue of the first polymer.

11. A polarizer, comprising:
a resin layer comprising a resin composition, wherein the resin composition comprises a first polymer and a polymer-modified whisker dispersed in the first polymer, the polymer-modified whisker comprises an inorganic whisker and a second polymer attached to a surface of the inorganic whisker, the first polymer is a lipophilic polymer, and the second polymer is a lipophilic polymer.

12. The polarizer according to claim 11, further comprising a polarizing layer, a first protection layer, and a hard coating layer, wherein the resin layer is located between the polarizing layer and the hard coating layer, and the first protection layer is located between the resin layer and the polarizing layer.

13. The polarizer according to claim 12, wherein an orthographic projection of a long axis of the polymer-modified whisker of the resin layer in a first plane has a first orientation angle, an orthographic projection of an absorption axis of the polarizing layer in the first plane has a second orientation angle, and an average difference between the first orientation angle and the second orientation angle is greater than or equal to −15° and less than or equal to 15°, and the first plane is parallel to a plane in which the polarizing layer is located.

14. The polarizer according to claim 12, wherein an included angle is formed between a long axis of the polymer-modified whisker and a first plane, the included angle is an acute angle that has an angle value less than or equal to 40°, and the first plane is parallel to a plane in which the polarizing layer is located.

15. The polarizer according to claim 12, wherein an orthographic projection of a long axis of the polymer-modified whisker of the resin layer in a first plane has a first orientation angle, an orthographic projection of an absorption axis of the polarizing layer in the first plane has a second orientation angle, and an average difference between the first orientation angle and the second orientation angle is greater than or equal to −15° and less than or equal to 15°, and the first plane is parallel to a plane in which the polarizing layer is located; and
an included angle is formed between the long axis of the polymer-modified whisker and the first plane, the included angle is an acute angle that has an angle value less than or equal to 40°.

16. The polarizer according to claim 11, further comprising a polarizing layer, a first protection layer, and a hard coating layer, wherein the resin layer is located between the polarizing layer and the hard coating layer, and the first protection layer is located between the resin layer and the hard coating layer.

17. The polarizer according to claim 11, wherein the resin layer is configured to use as any one of a polarizing layer, a first protection layer, or a hard coating layer.

18. A display device, comprising:
a display panel;
a polarizer on a light-outputting side of the display panel, wherein the polarizer comprises a resin layer comprising a resin composition;
the resin composition comprises a first polymer and a polymer-modified whisker dispersed in the first polymer, the polymer-modified whisker comprises an inorganic whisker and a second polymer attached to a surface of the inorganic whisker, the first polymer is a lipophilic polymer, and the second polymer is a lipophilic polymer.

19. The display device according to claim 18, wherein the inorganic whisker is at least one selected from a first type whisker, a second type whisker, a third type whisker, a fourth type whisker, or a fifth type whisker,
along an extension direction of a long axis of the first type whisker, a change in a diameter of the first type whisker is less than or equal to 0.3 microns;
along an extension direction of a long axis of the second type whisker, a change in a diameter of a middle section of the second type whisker is less than or equal to 1 micron; in a direction away from the middle section of the second type whisker, a diameter of a first end of the second type whisker gradually decreases, and a change in a diameter of a second end of the second type whisker is less than or equal to 1 micron;
along an extension direction of a long axis of the third type whisker, a change in a diameter of a middle section of the third type whisker is less than or equal to 1 micron; in a direction away from the middle section of the third type whisker, a diameter of a first end of the third type whisker gradually decreases, and a diameter of a second end of the third type whisker gradually decreases;
a first end of the fourth type whisker is sequentially connected to a second end of the fourth type whisker, and in a direction from the first end of the fourth type whisker toward the second end of the fourth type whisker, a diameter of the fourth type whisker gradually decreases;

a first end of the fifth type whisker is sequentially connected to a second end of the fifth type whisker, a diameter of a first end of the fifth type whisker gradually decreases in a direction away from the second end of the fifth type whisker, and a diameter of the second end of the fifth type whisker gradually decreases in a direction away from the first end of the fifth type whisker.

* * * * *